United States Patent [19]

Saito et al.

[11] 4,346,974
[45] Aug. 31, 1982

[54] LIGHT LEAKAGE PREVENTING DEVICE FOR REFLEX CAMERAS

[75] Inventors: Toshihisa Saito, Tokyo; Nobuyoshi Inoue, Kawagoe, both of Japan

[73] Assignee: Copal Company Limited, Tokyo, Japan

[21] Appl. No.: 264,694

[22] Filed: May 18, 1981

[30] Foreign Application Priority Data

May 19, 1980 [JP]  Japan .................. 55-68371[U]
May 19, 1980 [JP]  Japan .................. 55-68372[U]

[51] Int. Cl.³ ............................................. G03B 19/12
[52] U.S. Cl. ..................................................... 354/154
[58] Field of Search ................................. 354/152–156

[56] References Cited

U.S. PATENT DOCUMENTS 1,221,304  4/1917  Folmer ..................... 354/156
2,916,978 12/1959  Harter et al. .............. 354/153
3,675,557  7/1972  Yokozato et al. ........... 354/153
3,720,149  3/1973  Ishizaka et al. ............ 354/154

FOREIGN PATENT DOCUMENTS 356473 11/1921  Fed. Rep. of Germany ...... 354/152
2446 of 1912  United Kingdom ................ 354/156

Primary Examiner—Donald A. Griffin
Attorney, Agent, or Firm—Cushman, Darby & Cushman

[57] ABSTRACT

A light leakage preventing device for reflex cameras wherein a flexible light intercepting member is provided between the upper edge of a reflecting mirror and the vertical wall of a mirror box and a light intercepting member which can be brought to a light intercepting position in association with the movement of the reflecting mirror is provided between the lower edge of the reflecting mirror and the bottom wall of the mirror box so that, when the reflecting mirror is in a position in which it can conduct a light from an object to be photographed to a view finder, the light leakage from the upper edge and lower edge of the reflecting mirror to a film can be positively prevented.

8 Claims, 6 Drawing Figures

4,346,974

LIGHT LEAKAGE PREVENTING DEVICE FOR REFLEX CAMERAS

BACKGROUND OF THE INVENTION (a) Field of the Invention

This invention relates to a light leakage preventing device in a reflex camera wherein, when a reflecting mirror is in a position in which it can conduct a light from an object to be photographed to a finder system, the light can be prevented from leaking from the upper edge and lower edge of the reflecting mirror to a film.

(b) Description of the Prior Art

In a conventional reflex camera, as no particular light intercepting device is provided on the bottom part of a mirror box formed within the camera body or the free end edge of a reflecting mirror rotatably provided within the mirror box, even when the reflecting mirror is in a position (that is, a down position) in which it can not conduct a light from an object to be photographed to a finder system, the entry of the light toward the film surface through between the free end edge, that is, the lower end edge of the reflecting mirror and the floor surface of the mirror box can not be avoided. Therefore, in a focal plane shutter device to be set between the rear part of the mirror box and the film, a means of intercepting the above mentioned entering light has had to be taken. That is to say, in case a blade type focal plane shutter formed, for example, by overlapping a plurality of laminas is used, the overlaps of the respective laminas will have to be made large to prevent the light leakage. This means that the areas of the respective laminas must be made larger. Therefore, the masses of the laminas will increase. If the respective laminas thus become larger and the masses increase, it will become hard to obtain a shutter device operating at a high speed and it will become impossible to meet the requirement of making the shutter device small.

SUMMARY OF THE INVENTION

Therefore, an object of the present invention is to provide a reflex camera wherein, when a reflecting mirror is in a down position, a light can be perfectly intercepted between the lower end edge of the reflecting mirror and the floor surface of a mirror box.

According to the present invention, this object is attained by providing a light intercepting member which can be brought to a light intercepting position in association with the movement of the reflecting mirror in order to intercept the light to pass through between the lower edge of the reflecting mirror and the floor surface of the mirror box when the reflecting mirror is moved to the down position from the leaped-up position.

Another object of the present invention is to provide a single lens reflex camere provided with a small blade type focal plane shutter device capable of a high speed exposure.

According to a preferred formation of the present invention, a light intercepting member is formed as a cover plate covering a slit-shaped space formed between the lower edge of a reflecting mirror and the floor surface of a mirror box and extending over the entire lateral width of the mirror box by standing up from the bottom of the mirror box when the reflecting mirror is brought to a down position. When the reflecting mirror is brought to a leaped-up position, this cover plate will be pushed by a driving member for leaping up the reflecting mirror and will be contained in a groove formed in the bottom of the mirror box and extending over the entire lateral width of the mirror box.

According to another formation of the present invention, a light intercepting member is formed as a cover plate pivoted to the free end of a reflecting mirror and extending over the entire lateral width of the reflecting mirror. When the reflecting mirror is brought to a down position, this cover plate will be brought to a covering position in cooperation with a groove or rib formed on the floor surface of the mirror box and extending over the entire lateral width of the mirror box.

These and other objects of the present invention will become more apparent during the course of the following detailed description and appended claims.

DESCRIPTION OF THE PREFERRED EMBODIMENTS

Figure 1:
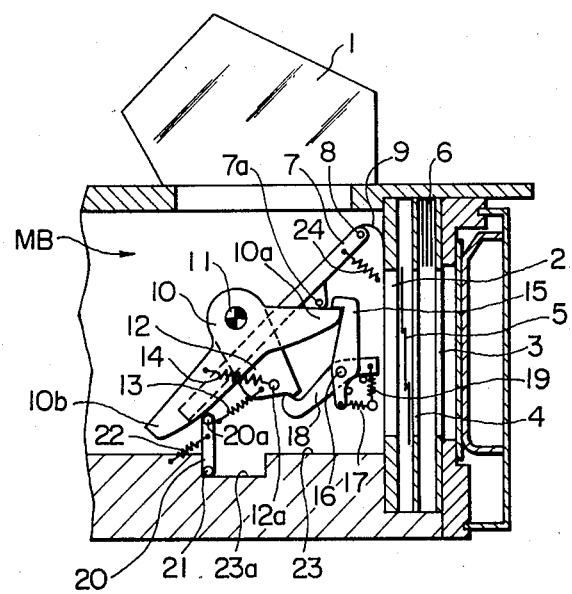
FIG. 1 is a sectional view of an essential part, showing in operation an embodiment of a light leakage preventing device according to the present invention.
Figure 2:
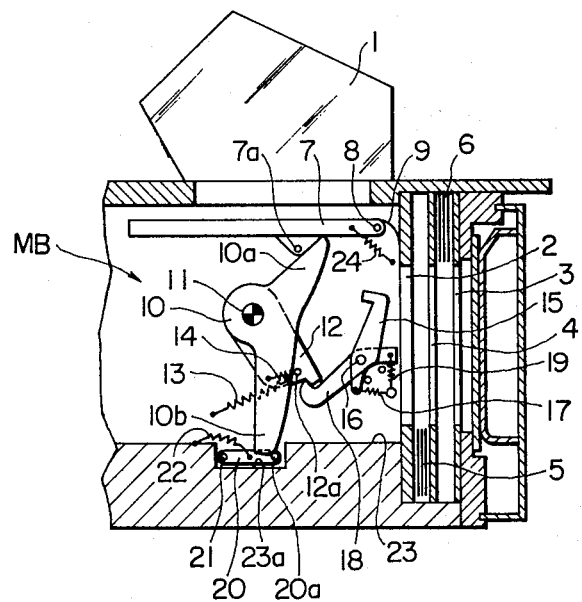
FIG. 2 is a sectional view of an essential part in case the light leakage preventing device shown in FIG. 1 is in inoperation.

First, in FIGS. 1 and 2, reference numeral 1 denotes a penta-prism forming an element in a finder system, 2 and 3 denote shutter base plates, 4 denotes an intermediate plate, 5 denotes an opening blade of a known focal plane shutter consisting of a plurality of laminas, 6 denotes a closing blade of the same, 7 denotes a known reflecting mirror pivoted in its base part by a shaft 8 between both side walls of a mirror box MB and having a pin 7a, 9 denotes a flexible light intercepting member interposed over the entire lateral width of the mirror box MB between the upper edge of the reflecting mirror 7 and the shutter base plate 2 to intercept a light above the reflecting mirror 7, 10 denotes a driving member for leaping up the reflecting mirror 7 pivoted on the side walls of the mirror box MB and having arms 10a and 10b, 12 denotes a driving member for lowering the reflecting mirror 7 pivoted by a shaft 11 on the side walls of the mirror box MB, having a pin 12a and biased clockwise by a spring 13, 14 denotes a spring stretched between the driving members 10 and 12, 15 denotes a first locking member which is biased counterclockwise by a spring 17 and can be engaged with the arm 10a to lock the counterclockwise motion of the driving member 10, 18 denotes a second locking member which is pivoted by the shaft 16, is biased clockwised by a spring 19 and can lock the clockwise motion of the driving member 12, 20 denotes a cover plate to be used as a light intercepting member pivoted by a shaft 21 between the side walls of the mirror box MB, biased counterclockwise by a spring 22, and having a pin 20a engaging with the arm 10b, 23 denotes a floor surface of the mirror box MB forming a groove 23a to contain the cover plate 20, and 24 denotes a spring counterclockwise biasing the mirror 7. The cover plate 20 and groove 23a extend over the entire lateral width of the mirror box MB.

The operation shall be explained in the following.

In FIG. 1, when the first locking member 15 is moved clockwise by the operation of a camera release not illustrated and the driving member 10 is unlocked and is rotated counterclockwise, the pin 7a will be pushed by the arm 10a to rotate the mirror 7 clockwise and the pin 20a will be pushed by the arm 10b to rotate the cover plate 20 clockwise against the spring 22 and push down and contain the cover plate 20 within the groove 23a so as to be in the state shown in FIG. 2. Then, the shutter opening and closing operation will be made to take a photograph. After the photographing thus ends, for example, when the second locking member 18 is moved counterclockwise by a signal from the shutter, the driving member 12 will be rotated clockwise by the spring 13 and, in such case, the driving member 10 will be also rotated clockwise. By this clockwise rotation of the driving member 10, the arm 10a will retreat from the pin 7a and therefore the mirror 7 will be rotated counterclockwise by the spring 24. Also, the arm 10b will retreat from the pin 20a, therefore the cover plate 20 will be rotated counterclockwise by the spring 22 so as to stand up and finally the arm 10a will come to engage with the first locking member 15. The film will be wound up for the next photographing. For example, when the driving member 12 is rotated counterclockwise in association with this motion, the springs 13 and 14 will be tensioned, the driving member 12 will be engaged with the second locking member 18 and all the device elements will again return to the state shown in FIG. 1.

According to the above described device, even if the photographing lens is directed toward the sun and the direct sunshine is incident into the mirror box MB, such incident light will be intercepted before it reaches the shutter blades or shutter curtain. Therefore, there is obtained an advantage that the shutter of plastic or rubber cloth can be prevented from being burnt and damaged. Further, as the cover plate 20 is fitted so as to be able to stand up and fall down with respect to the floor surface 23 and is formed so as to be operatively connected with the operation of leaping up and lowering the mirror 7, there are advantages that, when the mirror 7 is leaped up, the photographing light path will not be obstructed and, when the mirror 7 is down, the lower part of the mirror 7 will be effectively intercepted and the light can be prevented from leaking.

Figure 3:
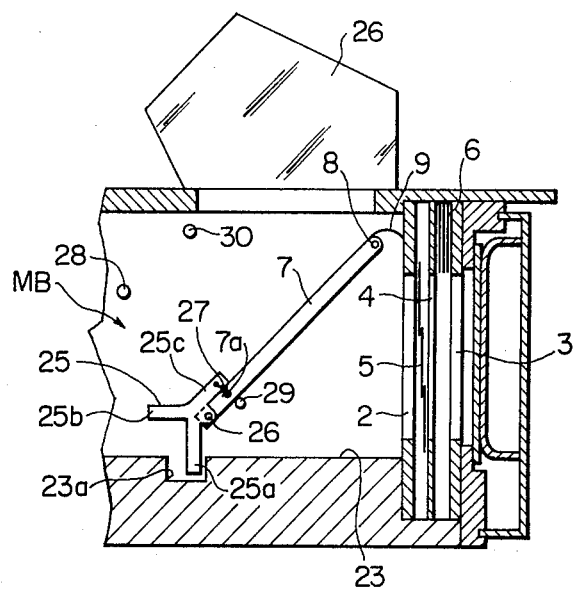
FIG. 3 is a sectional view of an essential part, showing in operation another embodiment of a light leakage preventing device according to the present invention.
Figure 4:
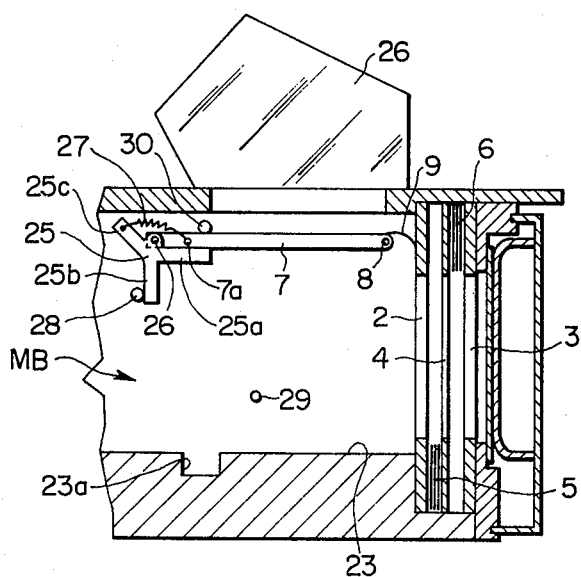
FIG. 4 is a sectional view of an essential part in case the light leakage preventing device shown in FIG. 3 is in inoperation.
Figure 6:
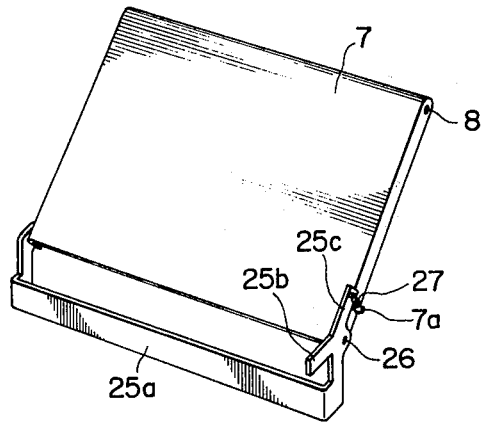
FIG. 6 is a perspective view showing an arrangement of a reflecting mirror and light intercepting member in the embodiments shown in FIGS. 3 to 5.

FIGS. 3 and 4 show another embodiment. This embodiment is different from the embodiment shown in FIGS. 1 and 2 in respect that the cover plate serving as a light intercepting member is pivoted to the lower end of the reflecting mirror and can be brought to the covering position by a groove formed on the floor surface of the mirror box. Now, this embodiment shall be explained by attaching the same reference numerals to the parts in the embodiment shown in FIGS. 1 and 2 and the same parts or portions as those parts. That is to say, reference numeral 25 denotes a light intercepting member which is pivoted to the lower end of the reflecting mirror 7 by a shaft 26, is biased clockwise by a spring 27 and has a light intercepting part 25a extending over the entire lateral width of the mirror box MB as clearly shown in FIG. 6 and arm parts 25b and 25c, 28 denotes a pin provided on the side wall of the mirror box MB and engageable with the arm 25b of the light intercepting member 25, and 29 and 30 denote pins provided on the side wall of the mirror box MB and determining the down position and leaped-up position of the reflecting mirror 7.

When the mirror 7 is rotated clockwise by the operation of a mirror driving mechanism not illustrated from the state in FIG. 3 in which the lower edge of the light intercepting part 25a has sunk into a groove 23a, the mirror 7 will integrally lift the light intercepting mumber 25 and the arm part 25b will engage with the pin 28 in the course. The mirror 7 will further continue to rotate clockwise and will be stopped by the pin 30. However, in this course, the arm part 25b will be stopped by the pin 28, the shaft 26 will rise as a result, therefore the light intercepting member 25 will rotate counterclockwise and the light intercepting part 25a will closely contact the mirror 7 and will retreat from the light path. When the opening blades 5 and closing blades 6 operate in this state and the photographing ends, the mirror driving mechanism will again operate to rotate the mirror 7 counterclockwise, thereby, with the fluctnation of its relative position with the pin 28, the light intercepting member 25 will be rotated clockwise by a pin 7b provided on the side surface of the mirror 7 and will return to the illustrated state.

Figure 5:
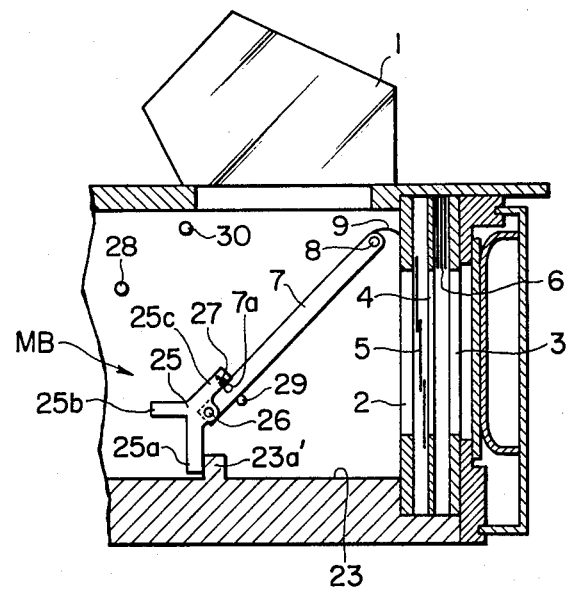
FIG. 5 is a sectional view of an essential part, showing in operation still another embodiment of a light leakage preventing device according to the present invention.

The embodiment wherein the groove 23a is provided on the floor surface 23 and the lower end of the light intercepting part 25a of the light intercepting member 25 is sunk into this groove 23a so as to perfectly intercept the light has been explained in the above with reference to FIGS. 3 and 4. However, even if a rib 23a' extending over the entire lateral width of the mirror box MB is provided on the floor surface 23 as shown in FIG. 5 instead of providing the groove 23a on the floor surface 23 or even if the lower end edge of the light intercepting part 25a is merely made to contact the floor surface 23, the same light intercepting effect will be obtained.

We claim:

1. A light leakage preventing device for reflex cameras comprising a mirror box, a reflecting mirror rotatably supported within said mirror box and movable between an up position and a down position, and a light intercepting member capable of being brought to a light intercepting position in association with the movement of said reflecting mirror in order to intercept light passing through between the lower edge of said reflecting mirror and the floor surface of said mirror box when said reflecting mirror is moved from the up position to the down position, said device further comprising a flexible light intercepting member interposed between the upper edge of said reflecting mirror and the rear wall of said mirror box and extending over the entire lateral width of said mirror box.

2. A light leakage preventing device according to claim 1 wherein said mirror box has a groove extending over the entire lateral width of said mirror box on its floor surface and said light intercepting member is formed as a cover plate pivoted to said reflecting mirror and having a light intercepting part and extending over the entire lateral width of said mirror box in order that said light intercepting part is stood up in cooperation with said groove when said reflecting mirror is brought from the up position to the down position and is made to closely contact said reflecting mirror when said reflecting mirror is brought from the down position to the leaped-up position.

3. A light leakage preventing device according to claim 1 further comprising a first driving member pivoted on the side wall of said mirror box and engaged with said reflecting mirror to move said reflecting mirror up, a first locking lever pivoted on the side wall of said mirror box and capable of locking said first driving member in its cocked position, a second driving member pivoted on the side wall of said mirror box and engageable with said first driving member to bring said reflecting mirror into its lowered position when released and a second locking member pivoted on the side wall of said mirror box and capable of locking said second driving member in its cocked position.

4. A light leakage preventing device for reflex cameras comprising a mirror box, a reflecting mirror rotatably supported within said mirror box and movable between an up position and a down position, and a light intercepting member capable of being brought to a light intercepting position in association with the movement of said reflecting mirror in order to intercept light passing through between the lower edge of said reflecting mirror and the floor surface of said mirror box when said reflecting mirror is moved from the up position to the down position, said mirror box having a groove extending over the entire lateral width of said mirror box on its floor surface and said light intercepting member being formed as a cover plate rotatably supported within said groove and extending over the entire lateral width of said mirror box so as to be stood up from within said groove when said reflecting mirror is brought from the up position to the down position and to be contained within said groove when said reflecting mirror is brought from the down position to the up position, said device further comprising a flexible light intercepting member interposed between the upper edge of said reflecting mirror and the rear wall of said mirror box and extending over the entire lateral width of said mirror box.

5. A light leakage preventing device for reflex cameras comprising a mirror box, a reflecting mirror rotatably supported within said mirror box and movable between an up position and a down position, and a light intercepting member capable of being brought to a light intercepting position in association with the movement of said reflecting mirror in order to intercept light passing through between the lower edge of said reflecting mirror and the floor surface of said mirror box when said reflecting mirror is moved from the up position to the down position, said mirror box having a rib extending over the entire lateral width of said mirror box on its floor surface and said light intercepting member being formed as a cover plate pivoted to said reflecting mirror and having a light intercepting part and extending over the entire lateral width of said mirror box in order that said light intercepting part is stood up in cooperation with said rib when said reflecting mirror is brought from the up position to the down position and is made to closely contact with said reflecting mirror when said reflecting mirror is brought from the down position to the up position.

6. A light leakage preventing device according to claim 5 further comprising a flexible light intercepting member interposed between the upper edge of said reflecting mirror and the rear wall of said mirror box and extending over the entire lateral width of said mirror box.

7. A light leakage preventing device for reflex cameras comprising a mirror box, a reflecting mirror rotatably supported within said mirror box and movable between an up position and a down position, and a light intercepting member capable of being brought to a light intercepting position in association with the movement of said reflecting mirror in order to intercept light passing through between the lower edge of said reflecting mirror and the floor surface of said mirror box when said reflecting mirror is moved from the up position to the down position, said light intercepting member being formed as a cover plate pivoted to said reflecting mirror and having a light intercepting part and extending over the entire lateral width of said mirror box in order that said light intercepting part is stood up in cooperation with the floor surface of said mirror box when said reflecting mirror is brought from the up position to the down position and is made to closely contact said reflecting mirror when said reflecting mirror is brought from the down position to the up position.

8. A light leakage preventing device according to claim 7 further comprising a flexible light intercepting member interposed between the upper edge of said reflecting mirror and the rear wall of said mirror box and extending over the entire lateral width of said mirror box.

* * * * *